April 19, 1955   G. M. EHLERS   2,706,742
RESIN SEALED ELASTOMERIC HOUSING FOR ELECTRICAL COMPONENTS
Filed Oct. 14, 1950

INVENTOR.
GEORGE M. EHLERS
BY
*Arthur J. Hennelly*
HIS ATTORNEY

United States Patent Office 2,706,742
Patented Apr. 19, 1955

2,706,742
RESIN SEALED ELASTOMERIC HOUSING FOR ELECTRICAL COMPONENTS

George M. Ehlers, Milwaukee, Wis., assignor to Sprague Electric Company of Wisconsin, Inc., a corporation of Wisconsin Application October 14, 1950, Serial No. 190,134

3 Claims. (Cl. 174—52)

This invention relates to improved high voltage electrical assemblies and more specifically refers to high voltage ceramic capacitors whose casing is also a mounting fixture.

High voltage electrical devices are usually mounted or encased in glass or porcelain housing with metal terminal seals or in metal containers with glass or porcelain terminal elements. Structures of these types provide suitable insulation between points of opposite polarity and can also be fabricated to include mounting elements. These assemblies are usually quite expensive and their use is accordingly restricted to applications in which cost is not an important factor.

In the field of high voltage ceramic capacitors, such as used in television circuits and the like, thermosetting and related resins have been molded about the ceramic capacitor elements to provide a relatively inexpensive and yet durable insulating housing. Unfortunately, however, this type of capacitor assembly suffers from several disadvantages. First, the molding process requires the use of complex molds to accommodate and align the capacitor insert about which the resin is molded. Second, when a mounting lug, ring or bar is required within the assembly, an even more complex mold to accommodate the additional insert is required. Further, many of the resins most satisfactory from an insulation standpoint are relatively brittle and will crack or shatter when subjected to vibration or shock. The voltage breakdown between terminal elements is of course dependent upon the condition of the surface path, among other factors. It is important that a tight and permanent seal between the casing resin and the capacitor element be maintained in order to prevent creepage of moisture into the juncture. Further, the molded thermosetting resin jacket has a different coefficient of expansion than the ceramic dielectric insert, causing a strain and tending to cause a separation between jacket and capacitor.

It is an object of the present invention to overcome the foregoing and related disadvantages. A further object is to produce a novel casing arrangement for electrical resistors, inductors, and capacitors. A still further object is to produce a capacitor assembly in which the casing material will withstand severe shock and vibration without failure and at the same time serve as a mounting assembly for the capacitor element. Additional objects will become apparent from the following description and claims.

These objects are attained in accordance with the present invention wherein there is produced a high voltage electrical assembly comprising an elongated electrical circuit element with leads protruding from opposite extremities of said element, and encased in an open-ended elastomeric insulating housing, a thin film of a high-viscosity, water-repellent plastic or unctuous material covering the circuit element underneath the housing.

In one of its preferred embodiments this invention is concerned with a high voltage electrical capacitor assembly comprising a cylindrical ceramic capacitor unit with axial leads extending from the ends thereof compressively encased in a resilient rubber housing which encompasses the sides and portions of the ends of said capacitor, a thin film of a silicone rubber cement or silicone grease coating said capacitor unit and providing effective insulation and moisture resistance underneath the housing.

One of the limited embodiments of the invention is concerned with assemblies such as described above wherein the casing is provided with a plurality of peripheral grooves at least one of which serves as a grommet type mounting point for insertion of the capacitor assembly through a hole in a thin panel.

According to my invention, I have discovered a simple structural arrangement for a high voltage casing for capacitors, resistors, and inductors, collectively identified as electric circuit components. I provide an elastomeric resilient sleeve of natural rubber, neoprene or other elastomeric material, which is compressively applied to an elongated electric circuit element to provide a long creepage path and high voltage housing. This housing is preferably peripherally grooved to lengthen the creepage path and also to provide a grommet portion which can be snapped tight within a hole in a thin panel, such as a metal chassis. It should be noted that the flexible housing is independently molded and subsequently stretched over the molded device. At all operating temperatures, the flexible housing exerts compression on the insert. I have discovered that the application of a high viscosity water repellent grease such as a silicone grease, or oil, a hydrocarbon or perfluoro hydrocarbon grease or silicone cement provides an enormous increase in resistance to electrical breakdown or short circuit between high voltage points of the circuit element. Without the application of this grease or cement to the electrical devices and/or to the housing prior to their assembly, the moisture resistance and breakdown voltage of the assembly is low. The assembly which employs the grease as an insulating barrier and interlayer between ceramic and rubber is characterized by extremely high voltage breakdown and a substantial inertness to the effects of humid moisture and atmosphere. Further these characteristics are maintained over a very wide temperature range.

The invention will be further described with reference to the appended drawing in which.

Figure 1:
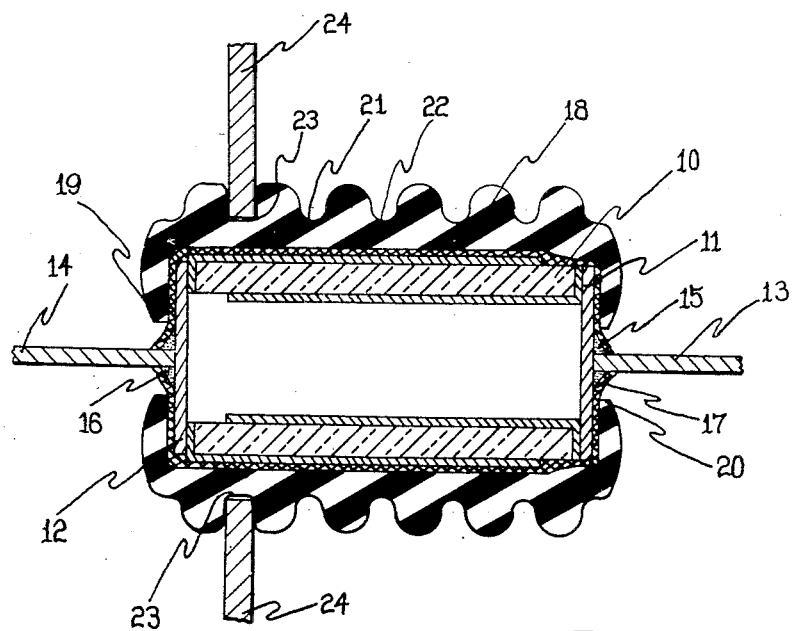
Fig. 1 shows one embodiment of the present invention.

Referring to Fig. 1, 10 represents a cylindrical ceramic capacitor dielectric with terminal plates 11, 12 soldered to silvered electrodes disposed on opposite portions of the cylinder. Terminal lead wires 13 and 14 are connected to terminals 11 and 12 respectively as by means of welded joints 15 and 16. A thin film of dielectric grease 17 is disposed about substantially the entire surface of the capacitor element. The thickness of this grease film is exaggerated for the sake of clarity, but need not be more than about 2 to 5 mils.

Flexible elastomeric housing 18 encases the capacitor element and is in intimate contact with grease or cement 17. Casing 18 extends over the ends of the capacitor device 10 as indicated at 19 and 20 in order to provide a long creepage path and maximum breakdown voltage. It will be noted that portion 19 of casing 18 has an inner diameter sufficiently large when stretched considerably to permit insertion of capacitor 10 within the housing after molding of the latter and at all times and throughout temperature changes the jacket always remains tightly stretched over the ceramic dielectric capacitor or insert. Since casing 18 consists of a flexible rubbery material, neck portion 19 can be stretched to possess an inner diameter greater than the maximum diameter of condenser section 10. In this way, insertion of the capacitor is conveniently accomplished and followed by a compressive action of the rubber thereon. A number of peripheral grooves 21, 22, 23 may be provided on the outside surface of casing 18 to increase the creepage path and voltage breakdown. Groove 23 is shown as used as a mounting grommet for capacitor 10. A thin panel, usually metal, provided with a hole serves as the mounting base and the edges of the panel are snap fitted into the groove 23. In the drawing the thin panel is represented as 24.

Figure 2:
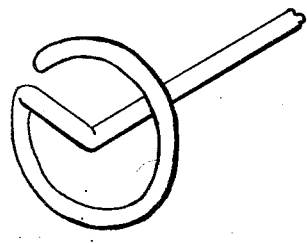
Fig. 2 shows a terminal lead in accordance with the invention.

Fig. 2 shows a terminal lead that consists of a flexible terminal lead wire one end of which is bent in the shape of a spiral consisting of one or more turns of the wire. The spiral shaped portion of the lead is disposed in a plane approximately perpendicular to the extending straight portion of the lead. The spiral shaped base portion of the terminal lead may be readily soldered directly to the capacitor electrodes of Figure 1 or to the terminal plates. When no terminal plates are used the inside of the condenser is open and preferably coated with the grease-like material.

Figure 3:
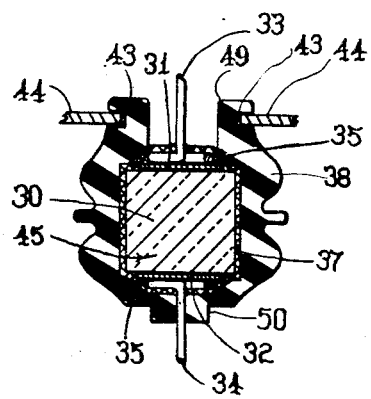
Fig. 3 shows a capacitor in accordance with another embodiment of the invention.

A particularly high voltage capacitor of the present invention is shown in Fig. 3. This construction is quite similar to that shown in Fig. 1 with the exception of the shape of casing 38 and the construction of capacitor section 45. Capacitor section 45 consists of a solid cylindrical ceramic dielectric core 30 with silvered electrodes 31 and 32 disposed on opposite ends of the cylinder. Terminal lead wires 33 and 34 of the type shown in Fig. 2 are soldered to electrodes 31, 32 by solder 35, 36 respectively. The entire capacitor section 45 is coated with a thin film of a silicone rubber cement 37, and the unit is housed in casing 38. Of the external corrugation in the housing, the one shown at 43 provides a grommet construction for mounting the capacitor in a panel 44. In this embodiment of the invention, one end 50 of the casing 38 has an opening only large enough to pass and tightly grip the associated lead 34, while the other casing end 49 is quite thick, but has a relatively wide aperture so that it can be more readily stretched over the capacitor core. A casing aperture of ⅜ inch projecting outwardly ⅜ of an inch is particularly suitable in that it simplifies the subsequent mounting of the completed unit in a panel opening.

Throughout the specification the word "elastomer" is intended to refer to rubbery materials possessing outstanding dielectric properties as well as the physical properties necessary to the success of the invention. Among such rubbery materials are natural rubber, neoprene, synthetic rubber (butadiene-styrene co-polymers; isobutylene-butadiene co-polymers), silicone rubbers (organic substituted derivatives of

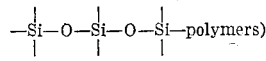

various polyvinyl compounds such as polymers and copolymers of vinyl chloride and vinyl acetate. It is essential that these materials exhibit elastomeric properties.

The grease, oil or silicone rubber cement employed between the rubber housing and the electrical device should be highly repellent to water and maintain a relatively uniform consistency, or, in the case of an oil, high viscosity, or, in the case of the cement, elasticity, over the operating temperature to which the device is to be subjected. Representative greases include silicone grease, hydrocarbon grease, perhalo ethylene greases (low polymers of tetrafluoroethylene and trifluoromonochloro ethylene) and similar materials. Silicone rubber cements have good adherence to the ceramic insert and sufficient elasticity for use herein. According to the preferred embodiments of the invention I employ the perhalo ethylene and silicone greases with neoprene rubber casings. It is desirable that the grease possess a relatively low inherent surface tension, thus wetting the surface of the ceramic and the rubber satisfactorily. At the same time the grease should not dissolve the materials which it contacts. An example of a casing that is extremely resistant to solution in or swelling by the greases is one made from polymers of trifluoro monochloro ethylene.

The silicone greases that are suitable for use in the present invention are polymeric organic polysiloxanes that vary from oily liquids to heavy jellies, greases or cements, such as the polymeric dimethyl polysiloxanes commercially available under the designations of "Dow-Corning stock-cock grease," "Dow-Corning plug-cock grease," "Dow-Corning Type 200 fluid," "Dow-Corning Type 500 fluid," and "Dow-Corning ignition sealing grease." These polymeric dimethyl silicones may be prepared by the methods more particularly disclosed in U. S. P. 2,258,218 and 2,286,763 to E. C. Rochow or by the process of McGregor et al. U. S. P. 2,384,384. Further descriptions of such greases appear in the following publications:

An article by Kipping beginning on page 325 of the February 26, 1949 issue of "Chemical Age."

An article by Walker beginning on page 749 of the December 15, 1947 issue of the "Proceedings of the American Association of Textile Chemists."

Typical of the silicone cements that are suitable for use in the present invention are described in Wright et al. U. S. Patent No. 2,389,477 granted November 20, 1945; Poskitt et al. U. S. Patent No. 2,467,853 granted April 19, 1949, and Sowa U. S. Patent No. 2,502,286 granted March 28, 1950.

As previously indicated the invention is applicable to a wide variety of electrical devices such as resistors, inductors, networks and the like. A preferred use is with ceramic capacitors for high voltage service. The invention avoids the use of complex molds and variations in the dimensions of the inserted device do not affect the performance of the housing arrangement. The assemblies can withstand severe shock and vibration without failure even when mounted in the chassis of communications equipment for military aircraft and the like. Further, a mounting means is provided without additional expense or materials. This mounting groove is particularly desirable since it is shock resistant and permits relative movements between the electrical unit and the mounting assembly.

The moisture resistance of the assembly is outstanding despite the fact that the housing may be considered to be incomplete in that the capacitor or other electrical unit is not totally encased with the elastomeric material.

As many widely and different embodiments of this invention may be made without departing from the spirit and scope hereof, it is to be understood that the invention is not limited to the specific embodiments hereof except as defined in the appended claims. Thus it is clear that the encased electric circuit element can have a transverse cross section that is rectangular, polygonal, elliptical or irregular. The longitudinal cross sectional shape is also subject to wide variation. Inasmuch as the housing is of elastomeric nature, it is readily molded in any desired shape to fit the core and can be pulled off molding cores having relatively deeply undercut portions. Non-circular transverse cross sections are particularly suitable for condenser sections that are to be kept from rotation around their longitudinal axes, as for example, when the leads are to be kept in a fixed position.

I claim:

1. A high voltage electrical capacitor assembly consisting essentially of a cylindrical ceramic capacitor unit with leads extending from the ends thereof, a flexible rubber housing compressively encasing the sides and portions of both ends of said capacitor, a thin film of a silicone resin coating said capacitor unit and separating it from said housing, said housing having circularly extending peripheral grooves at least one of which is a grommet-type mounting groove providing the sole support for holding the capacitor assembly in a hole in a panel.

2. A high voltage electrical capacitor assembly having a cylindrical capacitor dielectric with electrodes at its opposite ends, terminal leads connected to the electrodes and projecting axially from these ends, a resilient rubber housing surrounding the dielectric over its entire length and at least partially over both ends, said housing being stretched by the dielectric to hold it under compression over its entire range of operating temperatures, and a film of silicone grease between the dielectric and the housing and completely coating the dielectric, said housing having an external grommet-type groove extending radially around it and providing the sole support for mounting the capacitor assembly grommet fashion in a hole in a panel.

3. A high voltage electrical capacitor assembly having a cylindrical capacitor dielectric with electrodes at its opposite ends, terminal leads connected to the electrodes and projecting axially from these ends, a resilient rubber housing surrounding the dielectric over its entire length and at least partially over both ends, said housing being stretched by the dielectric to hold it under compression over its entire range of operating temperatures, one end of the housing having an encircling grommet-type groove offset from the capacitor dielectric.

References Cited in the file of this patent

UNITED STATES PATENTS

| | | |
|---|---|---|
| 1,983,347 | Daley et al. | Dec. 4, 1934 |
| 2,017,519 | Waldron | Oct. 15, 1935 |
| 2,269,076 | Boll | Jan. 6, 1942 |
| 2,436,857 | Dubilier | Mar. 2, 1948 |

(Other references on following page)

UNITED STATES PATENTS

| | | |
|---|---|---|
| 2,454,625 | Bondon | Nov. 23, 1948 |

FOREIGN PATENTS

| | | |
|---|---|---|
| 439,081 | Great Britain | Nov. 28, 1935 |
| 477,879 | Great Britain | Jan. 7, 1938 |
| 583,493 | Great Britain | Dec. 19, 1946 |
| 591,012 | Great Britain | Aug. 5, 1947 |

OTHER REFERENCES

General Electric Review August 1944 (pages 6 and 13 relied on). (Copy in Division 65.) 174—110.7.